United States Patent [19]
Swanson

[11] Patent Number: 4,941,279
[45] Date of Patent: Jul. 17, 1990

[54] FISHING LURE

[76] Inventor: Sandra G. Swanson, R.D. Box 89, Randolph, N.Y. 14772

[21] Appl. No.: 354,788

[22] Filed: May 22, 1989

[51] Int. Cl.⁵ ............................................. A01K 91/02
[52] U.S. Cl. ..................................... 43/42.22; 43/43.1
[58] Field of Search ................. 43/42, 42.22, 43.1, 43/43.14

[56] References Cited

U.S. PATENT DOCUMENTS

| | | |
|---|---|---|
| 2,851,816 | 9/1958 | Gehrig . |
| 2,907,133 | 10/1959 | Myers .................................. 43/43.1 |
| 2,961,793 | 11/1960 | Buchanan ............................ 43/43.1 |
| 3,139,693 | 7/1964 | Newman . |
| 3,698,121 | 10/1972 | Nordeen ............................. 43/43.14 |
| 3,757,453 | 9/1973 | Therres ............................... 43/43.14 |
| 3,947,990 | 4/1976 | Johnson . |
| 4,141,171 | 2/1979 | Muddiman . |
| 4,357,775 | 11/1982 | Click . |
| 4,432,157 | 2/1984 | Gowing . |
| 4,738,047 | 4/1988 | Ryan . |

*Primary Examiner*—M. Jordan
*Attorney, Agent, or Firm*—Laubscher, Presta & Laubscher

[57] ABSTRACT

A fishing lure has a buoyant body with a weight connected with the bottom thereof to properly orient the lure in an upright position when it is cast into a body of water. The lure is characterized by a rigid, bendable support arm. One end of the arm extends upwardly and rearwardly of the lure to suspend a baited hook or fly above the water surface. The other end of the arm is reversely folded below the body to define a loop with which a lower hook can be connected. Thus the lure is capable of catching fish which feed under water and fish that jump for food.

6 Claims, 1 Drawing Sheet

U.S. Patent        Jul. 17, 1990        4,941,279
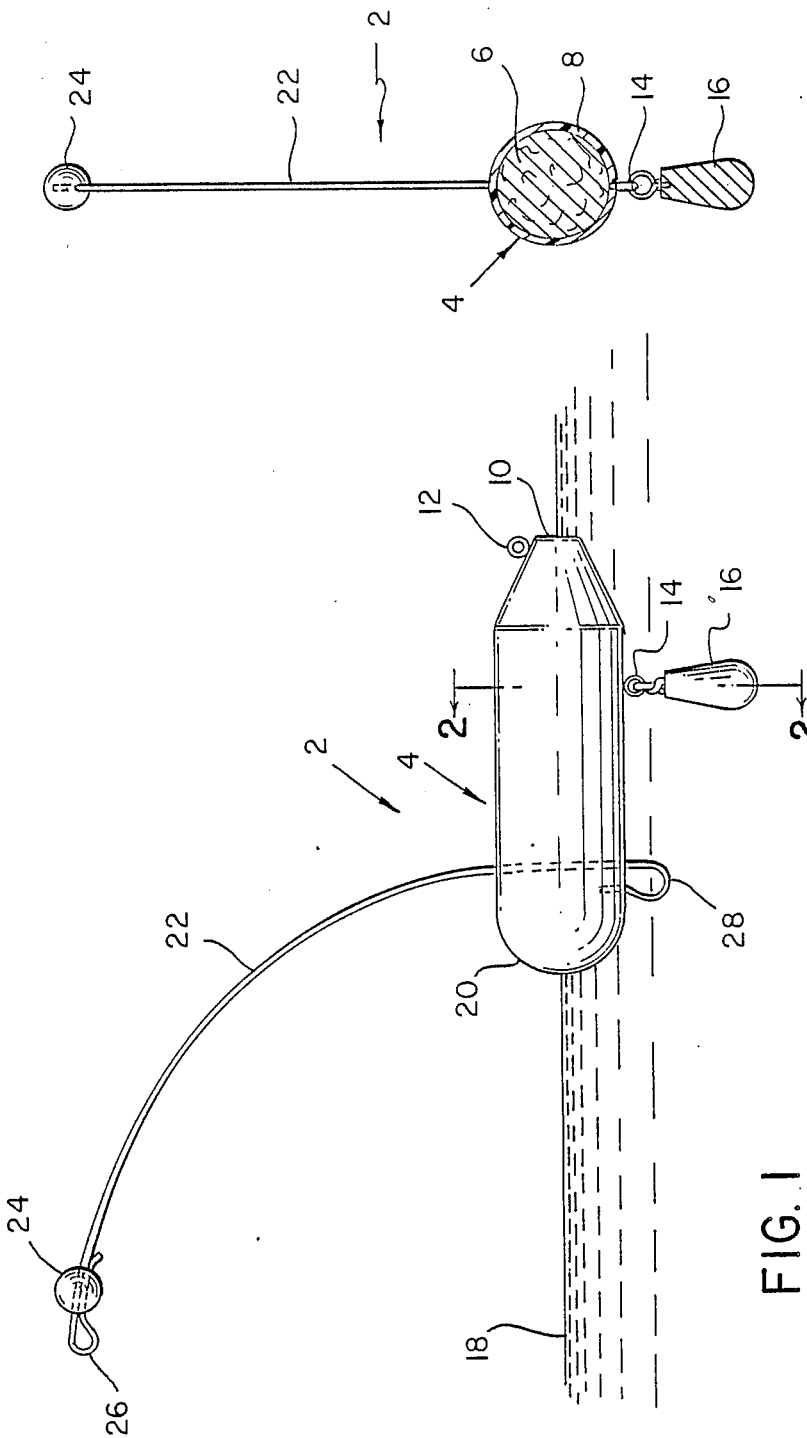

FISHING LURE

BACKGROUND OF THE INVENTION

The present invention relates to an improved buoyant fishing lure which is used for catching fish which remain in a body of water as well as those which leap from the body of water to catch their food.

BRIEF DESCRIPTION OF THE PRIOR ART

Buoyant fishing lures are well-known in the prior art as evidenced by the U.S. patents to Gehrig U.S. Pat. No. 2,851,816, Newman U.S. Pat. No. 3,139,693, Johnson U.S. Pat. No. 3,947,990, Muddiman U.S. Pat. No. 4,141,171, and Gowing U.S. Pat. No. 4,432,157.

The Gehring patent, for example, discloses a combined fishing weight and dry fly. The fishing weight remains just under the water surface and is attached at the front to a fishing line. A wiry resilient hookleader emerges from the top of the fishing weight body and curves rearwardly therefrom. A dry fly or floating lure is attached to the trailing section of the wiry hookleader for fishing on the surface of the water.

The Muddiman patent discloses a buoyant fishing lure which floats in a body of water and which will jump upwardly from the water when pulling force is applied to the lure via a fish line. The lure includes a duplex fish hook which remains above the water surface.

While the prior devices normally operate satisfactorily, they suffer from various drawbacks. For example, many of the lures can only function properly if subjected to either a continuous or intermittent pulling force from a fishing line. Another drawback of the prior buoyant lures is that they are not suitable for catching different types of fish, including those having a tendency to leap from the water for food and those which remain submerged and eat from the surface of the water.

SUMMARY OF THE INVENTION

Accordingly, it is a primary object of the present invention to provide a fishing lure having an elongated generally cylindrical body formed of buoyant material for floating on a body of water. A weight is connected with the bottom of the body toward one end thereof. The weight serves to orient the body in an upright position when the body is floating on the water. A bait support arm is connected with the other end of the body and extends upwardly and rearwardly from the body. The remote end of the arm has a hook, fly, piece of bait or the like connected therewith and is spaced above the surface of the water. The arm is formed of a rigid, bendable material and may be bent by the user to adjust the height of the bait or the like at the end of the arm relative to the water surface. An eyelet is connected with the top surface of the body toward the weighted end and is adapted for connection with the end of a fishing line. When the lure is cast into the water, it assumes an upright position owing to the weight and suspends the bait at a given location above the water to attract fish which tend to leap from the water to feed.

The arm preferably passes through the body and out of the bottom thereof where it is folded back to define a loop with which a second hook and bait may be connected. The second hook is used to catch fish which feed either at or below the surface of the water.

BRIEF DESCRIPTION OF THE FIGURES

Other objects and advantages of the invention will become apparent from a study of the following specification when viewed in the light of the accompanying drawing, in which:

FIG. 1 is a plan view of the fishing lure according to the invention; and

FIG. 2 is a sectional view of the lure taken along line 2—2 of FIG. 1.

DETAILED DESCRIPTION

As shown in the drawing, the fishing lure 2 according to the invention includes a body 4 having an elongated configuration and a circular cross-sectional configuration as shown in FIG. 2. The body is formed of a buoyant material 6 such as wood or expanded foam and is covered with a thin vinyl layer 8 providing a smooth outer surface.

Referring to FIG. 1, the main portion of the fishing lure body 4 has a generally cylindrical configuration with a tapered front end 10. An eyelet 12 is connected with the top of the tapered front end 10 to enable the lure to be tied to the end of a fishing line (not shown).

A second eyelet 14 is connected with the bottom of the body 4 toward the tapered end 10. The eyelets 12, 14 are preferably threaded for screwing into the body 4 in a conventional manner. Connected with the bottom eyelet 14 is a weight 16 or sinker. The weight serves to orient the lure in its upright position on the surface of a body of water 18 as shown in FIG. 1.

Toward the rear end 20 of the body 4, there is provided a support arm 22. The arm is formed of a thin piece of rigid, bendable material such as metal. The free end of the support arm is folded back and secured with a fluorescent bead 24 to define a loop 26 which is arranged above the surface of the water 18 to the rear of the body 4. A baited hook or fly (not shown) is connected with the loop 26 and suspended thereby above the water. The height of the loop relative to the water can be adjusted by the user by bending the support arm 22 to a particular configuration.

At the lure body 4, the near end of the support arm 22 passes completely through the body and out of the bottom thereof where the arm is bent back into the body to define a lower loop 28 with which a second baited hook or the like is connected.

When baited hooks are connected with the loops 26, 28 and the support arm is adjusted to set the height of the rear loop 26 above the water, the lure is cast into the water. The weight 16 orients the lure to its upright position wherein the rear loop 26 is spaced above the water surface. The weight also balances the body from front to rear to compensate for the weight of the rearwardly suspended baited hook.

With the lure properly oriented and balanced in the water, it will naturally roll a slight amount from side-to-side (owing to the cylindrical configuration of the body) under the influence of wind, waves, and water currents. This rolling movement of the lure causes the baited hooks or flies connected with the loops 26, 28 to dance about like insects and attract the attention of fish within the water. Those fish, such as bass and crappy, which have a tendency to leap from the water to catch flying insects will leap for the bait suspended from the remote end of the support arm. Those fish which prefer to eat insects crawling on the water surface will be attracted by the bait suspended from the lower loop 28.

A leader attached to the lower loop will attract and catch deeper feeding fish.

Additional movement of the lure 2 can be provided by pulling or jerking the line connected with the forward eyelet 12.

The lure of the present invention is economical to manufacture, is simple to use, and is versatile enough to be used for catching a wide variety of fish.

While in accordance with the provisions of the patent statute the preferred forms and embodiments of the invention have been illustrated and described, it will be apparent to those of ordinary skill in the art that various changes and modifications may be made without deviating from the inventive concepts set forth above.

What is claimed is:

1. A fishing lure, comprising
    (a) an elongated body member formed of buoyant material for floating on the surface of a body of water;
    (b) a weight connected with the bottom of said body member toward one end thereof, said weight serving to orient said body member in an upright position on the surface;
    (c) a bait support arm connected with the other end of said body member and extending from the top thereof upwardly and rearwardly and including means at the remote end thereof adapted for connection with a fish hook and the like, said support arm being formed of a rigid, bendable material, whereby the distance of said arm remote end from the surface of the body of water may be varied in accordance with the configuration of said arm; and
    (d) means connected with the top of said body member adjacent said one end for attaching the lure to a fishing line, whereby when the lure is cast into the body of water, the lure will assume an upright position and suspend a fish hook, fly, or piece of bait above the water at the rear of the lure.

2. Apparatus as defined in claim 1, and further comprising a lower hook connection device extending from the bottom of said body member adjacent said body other end.

3. Apparatus as defined in claim 2, wherein said support arm extends through said body member and includes a reversely folded near end defining said lower hook connection device.

4. Apparatus as defined in claim 3, wherein said body member one end is tapered.

5. Apparatus as defined in claim 4, wherein said body member includes a coating of vinyl material.

6. Apparatus as defined in claim 5, wherein said body member has a generally circular cross-sectional configuration.

* * * * *